(12) United States Patent
Axmon et al.

(10) Patent No.: US 9,860,807 B2
(45) Date of Patent: Jan. 2, 2018

(54) HANDOVER IN HIGH SPEED SCENARIO

(71) Applicant: Telefonaktiebolaget L M Ericsson (publ), Stockholm (SE)

(72) Inventors: Joakim Axmon, Kavlinge (SE); Peter Alriksson, Horby (SE); Christopher Callender, Kinross (GB); Muhammad Kazmi, Bromma (SE); Torgny Palenius, Barseback (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/421,825

(22) PCT Filed: Jan. 30, 2015

(86) PCT No.: PCT/EP2015/051931
§ 371 (c)(1),
(2) Date: Feb. 14, 2015

(87) PCT Pub. No.: WO2016/119876
PCT Pub. Date: Aug. 4, 2016

(65) Prior Publication Data
US 2016/0345222 A1    Nov. 24, 2016

(51) Int. Cl.
*H04W 36/00* (2009.01)
*H04W 36/04* (2009.01)
(Continued)

(52) U.S. Cl.
CPC ............ *H04W 36/04* (2013.01); *H04W 8/02* (2013.01); *H04W 36/0016* (2013.01);
(Continued)

(58) Field of Classification Search
None
See application file for complete search history.

(56) References Cited

U.S. PATENT DOCUMENTS 8,675,788 B2    3/2014 Andgart et al.
8,892,103 B2    11/2014 Axmon et al.
(Continued)

FOREIGN PATENT DOCUMENTS

EP    1643790 A2    4/2006
EP    2242312 A1    10/2010
(Continued)

OTHER PUBLICATIONS

3GPP TR 36.819, V11.1.0 "Coordinated multi-point operation for LTE physical layer aspects (Release 11)" Dec. 2011, pp. 1-69.
(Continued)

*Primary Examiner* — Erika Washington
(74) *Attorney, Agent, or Firm* — Leffler Intellectual Property Law, PLLC

(57) ABSTRACT

A handover procedure is described where a user equipment, UE, is pre-configured by a network node of a source cell with one or more target cells and associated conditions to be fulfilled for the UE to autonomously decide when to execute the handover. The UE may be pre-configured while in good radio conditions, being connected to the source cell, and hence the UE does not risk going out of source cell coverage before being handed over to a target cell.

17 Claims, 11 Drawing Sheets

(51) Int. Cl.
*H04W 36/32* (2009.01)
*H04W 8/02* (2009.01)
*H04W 36/30* (2009.01)
*H04W 36/36* (2009.01)

(52) U.S. Cl.
CPC ....... *H04W 36/0072* (2013.01); *H04W 36/30* (2013.01); *H04W 36/32* (2013.01); *H04W 36/36* (2013.01)

(56) References Cited

U.S. PATENT DOCUMENTS

| | | | |
|---|---|---|---|
| 2012/0093128 A1* | 4/2012 | Song | H04W 36/0077 370/331 |
| 2012/0270594 A1 | 10/2012 | Parkvall et al. | |
| 2013/0244569 A1 | 9/2013 | Dunn et al. | |
| 2014/0045494 A1 | 2/2014 | Pekonen et al. | |
| 2014/0045498 A1* | 2/2014 | Choi | H04W 36/32 455/436 |
| 2015/0031364 A1 | 1/2015 | Chen et al. | |
| 2015/0043369 A1* | 2/2015 | Kim | H04J 11/005 370/252 |
| 2015/0079991 A1* | 3/2015 | Koskinen | H04W 36/0083 455/436 |
| 2015/0133121 A1* | 5/2015 | Li | H04W 24/10 455/436 |
| 2015/0215830 A1* | 7/2015 | Dalsgaard | H04W 36/0094 455/444 |

FOREIGN PATENT DOCUMENTS

| | | |
|---|---|---|
| EP | 2448329 A1 | 5/2012 |
| EP | 2819471 A1 | 12/2014 |
| WO | 2012112098 A1 | 8/2012 |
| WO | 2013038052 A1 | 3/2013 |
| WO | 2013114155 A1 | 8/2013 |
| WO | 2013141544 A1 | 9/2013 |
| WO | 2013177778 A1 | 12/2013 |
| WO | 2014089051 A1 | 6/2014 |
| WO | 2014161576 A1 | 10/2014 |
| WO | 2016055095 A1 | 4/2016 |

OTHER PUBLICATIONS

3GPP TS 36.331, V11.9.0 "Evolved Universal Terrestrial Radio Access (E-UTRA); Radio Resource Control (RRC); Protocol Specification (Release 11)", Sep. 2014, pp. 1-356.
3GPP TS 36.321, V11.5.0 "Evolved Universal Terrestrial Radio Access (E-UTRA); Medium Access Control (MAC) protocol specification (Release 11)", Mar. 2014, pp. 1-57.
3GPP TS 36.133, V11.10.0 "Evolved Universal Terrestrial Radio Access (E-UTRA); Requirements for support of radio resource management (Release 11)", Sep. 2014, Part 1 of 2, pp. 1-348.
3GPP TS 36.133, V11.10.0 "Evolved Universal Terrestrial Radio Access (E-UTRA); Requirements for support of radio resource management (Release 11)", Sep. 2014, Part 2 of 2, pp. 349-800.
3GPP TS 36.104, V11.11.0 "Evolved Universal Terrestrial Radio Access (E-UTRA); Base Station (BS) radio transmission and reception (Release 11)", Dec. 2014, pp. 1-136.
NTT Docomo, Inc. et al. "Motivation of New SI proposal: Performance enhancements for high speed scenario" 3GPP TSG RAN Meeting #66, Maui, Hawaii, Dec. 8-12, 2014, RP-141849, pp. 1-4.
NTT Docomo, Inc. et al. "LTE performance enhancement under high speed scenario" 3GPP TSG RAN Meeting #66, Maui, Hawaii, Dec. 8-12, 2014, RP-142307, pp. 1-7.
PCT International Search Report, dated Dec. 3, 2015, in connection with International Application No. PCT/EP2015/051903, all pages.
PCT Written Opinion, dated Dec. 3, 2015, in connection with International Application No. PCT/EP2015/051903, all pages.
PCT International Search Report, dated Oct. 20, 2015, in connection with International Application No. PCT/EP2015/051931, all pages.
PCT Written Opinion, dated Oct. 20, 2015, in connection with International Application No. PCT/EP2015/051931, all pages.
Non-Final Office Action dated Nov. 7, 2016 in connection with copending U.S. Appl. No. 14/421,824, all pages.

* cited by examiner

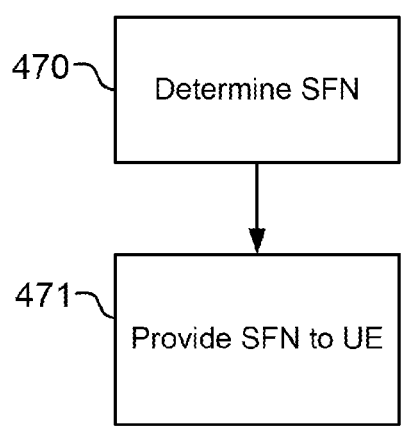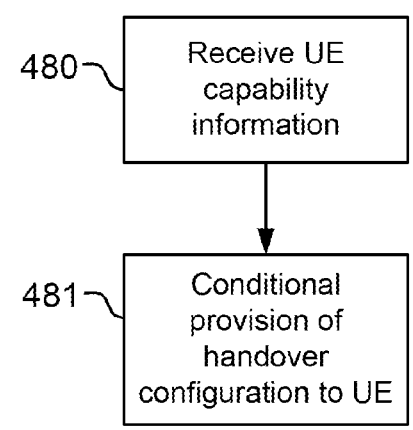
Fig. 4h
Fig. 4i

HANDOVER IN HIGH SPEED SCENARIO

TECHNICAL FIELD

Embodiments herein relate to a wireless communication system and more specifically to controlling handover in such a system.

BACKGROUND

Wireless communication systems, i.e. systems that provide communication services to wireless communication devices such as mobile phones, smartphones etc. (often denoted by UE that is short for user equipment), have evolved during the last decade into systems that must utilize the radio spectrum in the most efficient manner possible. A reason for this is the ever increasing demand for high speed data communication capabilities in terms of, e.g., bitrate and to provide these capabilities at any given time, at any geographical location and also in scenarios where the wireless communication device is moving at a high speed, e.g., on board a high speed train. The high speed scenario may further comprise of mission critical, MC, operations involving high speed vehicles in the air. Example of MC operation is Air Ground Air communications, A2G, where high speed vehicles may comprise of helicopters and planes containing wireless terminals. The A2G vehicles may be served by high speed radio nodes, also known as A2G base stations, A2G eNode B etc. The speed of helicopter and planes may be in the order of 200-300 km/h and 400-500 km/h respectively.

To meet this demand, within the third generation partnership project, 3GPP, work is being done regarding possible enhancements to radio resource management, RRM, performance in high speed train environments. The justification is that there are railways such as Japan Tohoku Shinkansen (running at 320 km/h), German ICE (330 km/h), AGV Italo (400 km/h), and Shanghai Maglev (430 km/h) which vehicles travel at greater than 300 km/h and where there is demand for using mobile services. In a motivation contribution to 3GPP RAN#66, RP-141849, four scenarios of interest to wireless communication network operators are disclosed. In a number of these scenarios, there is a dedicated network to provide railway coverage of the cellular system; either as a standalone network, or used in conjunction with a public network which is not specifically designed to provide high speed train coverage. The four scenarios in RP-141849 can be summarized as follows:

Scenario 1: A dedicated network is deployed along the railways (such as antenna nodes in the form of remote radio head, RRH, deployments). Separate carriers are utilized for dedicated and public networks. By sharing the same Cell identity among multiple RRHs, handover success rate can be increased to some extent.

Scenario 2: Separate carriers are utilized for high speed scenario. One carrier with good coverage serves as a primary cell, PCell, for mobility management. One carrier at high frequency may provide the good data transmission. Carrier aggregation, CA, or dual connectivity, DC, could be applied.

Scenario 3: A public network is deployed along the railways and repeaters are installed in train carriages. With repeaters, the signal quality can be improved although the penetration loss is large.

Scenario 4: A dedicated network is deployed along the railways and repeaters are installed in carriages.

Current standard specifications have partly taken UE speeds up to 300 km/h into account, but only in the context of data demodulation, not for cell detection. With increased deployment of high speed train lines, increased number of UE users, and increased usage of bandwidth per user, dominating network operators are requesting improved UE performance and support for speeds exceeding 300 km/h. Future high speed trains are expected to travel at speeds above 500 km/h, e.g. the Superconducting Magnetic Levitation train (SCMaglev) to be deployed in Japan, where train sets have already reached 580 km/h in speed tests.

Apart from the relatively shortened time for detecting suitable neighbor cells for handover or cell reselection, high speed movement of the UE may also lead to significant Doppler shifts of the received radio signals. Such a Doppler shift forces the UE to increase its demodulation frequency when moving towards a cell (i.e. moving towards an antenna that defines a radio lobe of the cell), and decrease demodulation frequency when moving away from a cell, in order to maintain an acceptable receiver performance.

The Doppler shift can be expressed as:

$$\Delta f = f \left( \sqrt{\frac{1 - \frac{v}{c}}{1 + \frac{v}{c}}} - 1 \right)$$

where c is the speed of light and v is the relative velocity of the UE towards the transmitting antenna. Referring to FIG. 1, an UE 101 is on a high speed train 103 on a railway track 104, connected to and moving away from cell A2 105 and quickly needs to detect cell B1 107 towards which the UE 101 is moving with a velocity $v_{UE}$ 109 of the train. According to current standard an antenna 111, 113 of a cell site can be as close as 2 m from the railway track 104, mainly motivated by that the wireless communication network would be integrated with the high-speed railway infrastructure. With an angle α between railway track 104 and a direction 106 to a cell antenna 113 and a UE velocity $v_{UE}$, the relative velocity v towards the transmitting antenna giving rise to Doppler shift is $v = v_{UE} \cos \alpha$.

With regard to handover of a UE from a source cell to a target cell or, in scenarios where carrier aggregation is used, handover to a new primary cell, PCell, configuration of a new secondary cell, SCell, and configuration and activation of a new primary secondary cell, PSCell, is usually based on measurement reports from the UE, where the UE has been configured by the network node to send measurement reports periodically, at particular events, or a combination thereof. Such measurement reports typically contain physical cell identity, reference signal strength, RSRP, and reference signal quality, RSRQ, of the detected cells. Handovers can also be blind (i.e. no measurements performed on target carrier and/or cell) based on the network node having knowledge about coverage on other carriers and location of the UE. An example of this can be found in U.S. Pat. No. 8,892,103 entitled "Methods and nodes supporting cell change".

The handover procedure is described in 3GPP TS 36.331 V11.9.0 and 3GPP TS 36.321 V11.5.0. Existing core requirements on interruption time are stated in 3GPP TS 36.133 V11.10.0. (Those as well as other referenced 3GPP specifications can be found at www.3gpp.org/ftp/Specs/.)

The latency at a handover to a known (measured) PCell counted from reception of the handover command at the UE antenna until the UE carries out contention-free random access towards the target cell, can be up to 65 ms comprising 15 ms radio resource control, RRC, procedure delay, 20 ms preparation time for the UE, and up to 30 ms latency for next physical random access channel, PRACH, occasion. One of the purposes with random access is to configure the UE with an appropriate timing advance value such that uplink transmissions by the UE are aligned with the subframe timing when received by the network node. Each random access attempt typically takes 20 ms hence in case the UE has to repeat the random access due to not getting response from the network node the time will be prolonged, but as a general figure one can assume 85 ms in total until the UE can resume communication in the target cell provided that the first attempt of random access is successful.

In the UE the preparation time is needed, e.g., for stopping processing and tearing down data structures and data memory associated with the source cell to release processing, memory and radio resources so they are available for the configuration to be used in the target cell. The reconfiguration may in general require re-partitioning of the data memories due to other bandwidth used in target cell, loading of new program code to support other transmission modes or radio access technology than in source cell.

However, there remain a number of challenges in relation to high-speed train scenarios in prior art. For example:

Some challenges with high-speed train scenarios in prior art:

The existing cell detection requirements do not take high UE speed relative the cell size into account. In non-DRX (DRX being short for discontinuous reception) the UE is allowed to take up to 800 ms to detect a newly detectable cell (signal-to-interference-plus-noise ratio, SINR, exceeding −6 dB). For DRX cycles longer than 40 ms the allowed detection time increases approximately proportionally with the cycle length and may take up to 51.2 s (see table 8.1.2.2.1.2-1 in 3GPP TS 36.133 V11.11.0). On top there are latencies in the handover signaling from the network to the UE. Depending on network deployment there may be a significant risk for the UE moving out of source cell coverage before it can get commanded to the target cell.

Provided that the UE is successful in the first random access attempt the user plane data transfer may be interrupted up to 85 ms. On top of this, rapidly changing sign of the Doppler shift may prolong the interruption as the UE has to retune its receiver.

Existing assumptions in 3GPP TS 36.104 on network deployments for high-speed train scenarios assume inter-cell distance of 300 m to 1000 m, meaning that the UE changes or passes a cell tower every 150 m to 500 m. This means that the UE will have to retune its receiver every 1.1 to 3.6 seconds when traveling at 500 km/h. Each handover-related and/or Doppler-related interruption will have a significant impact on both system and UE throughputs; each user plane interruption alone comprises 2% to 8% of the time between handovers.

The prior art RP-141849 partly addresses the problem by suggesting that several cells may share the same cell identity (by which the UE only sees Doppler shifts but is unaware of the handover between cell towers), but the fact still remains that when an explicit handover is carried out between such cell clusters, the interruption will have a significant impact on the system and UE throughputs.

The legacy handover procedure does not take into account that for a high speed train scenario the UE is bound to follow a particular trail, i.e. the path defined by the railway tracks upon which the high speed train is moving.

SUMMARY

In view of the above, an object of the present disclosure is to overcome or at least mitigate at least some of the drawbacks related to prior art in handling radio communication with wireless communication devices.

This is achieved in a first aspect by a method, performed by a network node in a network. The network node maintains a source cell in the network, to which source cell a user equipment, UE, is connected. The method comprises:

receiving, from at least one cell in the network, data that comprises information regarding handover, whereby the at least one cell in the network from which the data is received defines at least one predetermined target cell to which a UE is to perform handover, providing, to the UE, handover configuration data comprising the data received from the at least one cell and comprising at least one event triggering condition that defines radio signal measurement conditions for use by the UE when performing an autonomous decision to initiate the handover, and providing, to the at least one predetermined target cell, context information associated with the UE for preparing the target cell for a handover procedure initiated by the UE.

In other words, the present disclosure introduces a new kind of handover where the UE is pre-configured by the network node of the source cell with one or more target cells and associated conditions to be fulfilled for the UE to autonomously decide when to execute the handover. The UE may be pre-configured while in good radio conditions, being connected to the source cell, and hence the UE does not risk going out of source cell coverage before being handed over to a target cell.

The target cell is also pre-configured by the network node in the source cell at an earlier time than in prior art procedures. This means that the source cell provides information to the target cell on UE context necessary to execute the handover, and the target cell provides configuration information to the network node of source cell, which is indicated to the UE enabling the UE to become pre-configured while the UE is still in good radio conditions in connection with the network node of the source cell. In this way, the target cell has been made aware to expect an inbound handover from the UE at some point in the future, and the target cell has all necessary information to maintain the connection when this occurs, and correspondingly the UE has all necessary information to make a connection to the target cell autonomously when the trigger condition occurs.

In some embodiments, the at least one event triggering condition is configured for triggering any event of:

event AX being triggered by the UE based on an outcome of a comparison of signal measurements performed by the UE on the source cell and the at least one predetermined target cell, event AY being triggered by the UE based on an outcome of a comparison of a signal measurement performed by the UE on the source cell with a first threshold, and based on an outcome of a comparison of a signal measurement performed by the UE on the at least one predetermined target cell with a second threshold.

In some embodiments, the method comprises:
determining a mobility profile for the UE, the mobility profile comprising at least one movement criterion associated with the UE, and wherein:
the provision of the handover configuration data to the UE is conditional of the at least one movement criterion.

In some embodiments, the method comprises:
determining a range of positions of the UE in relation to the source cell and the at least one predetermined target cell, the range of positions defining a range in which the handover procedure is to be performed, and
providing, to the UE, data comprising at least one timing advance, TA, value for use in the at least one predetermined target cell.

In some embodiments, the method comprises:
determining at least one system frame number, SFN, offset between a SFN associated with the source cell and a SFN associated with the at least one predetermined target cell, and wherein the provision of the handover configuration data comprises:
providing, to the UE, data comprising the at least one SFN offset for use in the at least one predetermined target cell.

The object of the present disclosure is also achieved in a second aspect by a method, performed by a user equipment, UE, in a radio access network, RAN, where a network node maintains a source cell in the RAN, to which source cell the UE is connected. The method comprises:
receiving, from the network node, handover configuration data that comprises information regarding handover to at least one predetermined target cell to which the UE is to perform handover and at least one event triggering condition that defines radio signal measurement conditions for use by the UE when performing an autonomous decision to initiate the handover,
measuring radio signals associated with the source cell and radio signals associated with the at least one predetermined target cell, and
determining, based on the measuring of radio signals, an event according to the at least one event triggering condition, and
performing, based on the determined event, an autonomous decision to initiate handover to the at least one predetermined target cell.

In some embodiments, the at least one event triggering condition is configured for triggering any event of:
event AX being triggered by the UE based on an outcome of a comparison of signal measurements performed by the UE on the source cell and the at least one predetermined target cell,
event AY being triggered by the UE based on an outcome of a comparison of a signal measurement performed by the UE on the source cell with a first threshold, and based on an outcome of a comparison of a signal measurement performed by the UE on the at least one predetermined target cell with a second threshold.

In some embodiments, the method comprises:
determining a mobility profile for the UE, the mobility profile comprising at least one movement criterion associated with the UE, and wherein:
the performing of the autonomous decision to initiate handover is conditional of the at least one movement criterion.

In some embodiments, the reception of the handover configuration data comprises reception of at least one timing advance, TA, value for use in the at least one predetermined target cell, and the method comprises:
performing a handover procedure with the at least one predetermined target cell, wherein the handover procedure comprises requesting a scheduling grant without performing a random access, RA, procedure.

In some embodiments, the reception of the handover configuration data comprises reception of at least one system frame number, SFN, offset between a SFN associated with the source cell and a SFN associated with the at least one predetermined target cell, and the method comprises:
performing a handover procedure with the at least one predetermined target cell, wherein the handover procedure comprises requesting a scheduling grant without reading a master information block, MIB, associated the at least one predetermined target cell.

In a further aspect there is provided a network node. The network node comprises input/output circuitry, a processor and a memory. The memory contains instructions executable by the processor whereby the network node is operative to:
receive, from at least one cell in a network, data that comprises information regarding handover, whereby the at least one cell in the network from which the data is received defines at least one predetermined target cell to which a UE is to perform handover,
provide, to the UE, handover configuration data comprising the data received from the at least one cell and comprising at least one event triggering condition that defines radio signal measurement conditions for use by the UE when performing an autonomous decision to initiate the handover, and
provide, to the at least one predetermined target cell, context information associated with the UE for preparing the target cell for a handover procedure initiated by the UE.

In a further aspect there is provided a user equipment, UE, comprising radio frequency, RF, circuitry, a processor and a memory. The memory contains instructions executable by said processor whereby the UE is operative to:
receive, from a network node, handover configuration data that comprises information regarding handover to at least one predetermined target cell to which the UE is to perform handover and at least one event triggering condition that defines radio signal measurement conditions for use by the UE when performing an autonomous decision to initiate the handover,
measure radio signals associated with a source cell and radio signals associated with the at least one predetermined target cell,
determine, based on the measuring of radio signals, an event according to the at least one event triggering condition, and
perform, based on the determined event, an autonomous decision to initiate handover to the at least one predetermined target cell.

In further aspects there are provided computer programs, comprising instructions which, when executed on at least one processor in a network node and in a UE, cause the network node and the UE to carry out the methods as summarized above in connection with the first and second aspects.

In yet further aspects there are provided carrier comprising computer programs according to the summarized aspects above, wherein the carriers are one of an electronic signal, an optical signal, a radio signal and a computer readable storage medium.

These further aspects and respective embodiments that correspond to the embodiments of the first and second aspects provide the same effects and advantages as summarized above in connection with the methods of the first and second aspects.

BRIEF DESCRIPTION OF THE DRAWINGS

FIGS. 4a-i are flowcharts of embodiments of a method in a network node,

DETAILED DESCRIPTION

Figure 1:
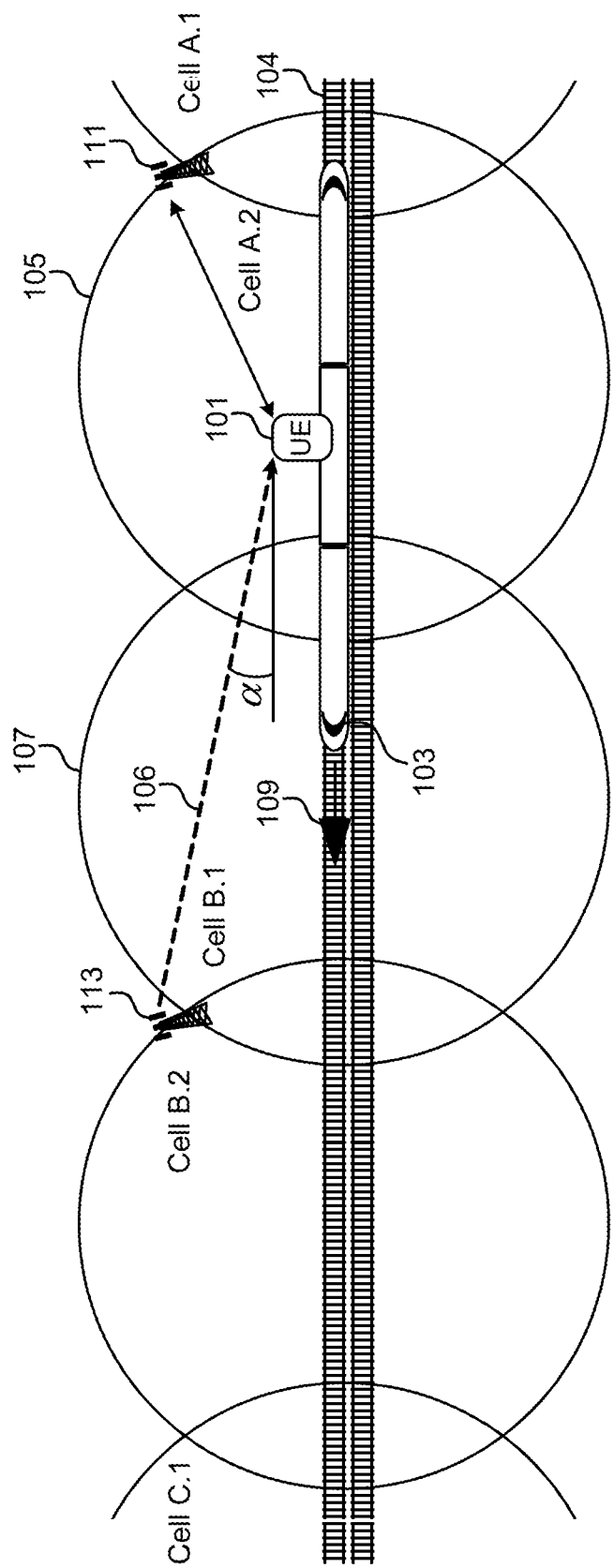
FIG. 1 schematically illustrates a UE on a high speed train.
Figure 2A:
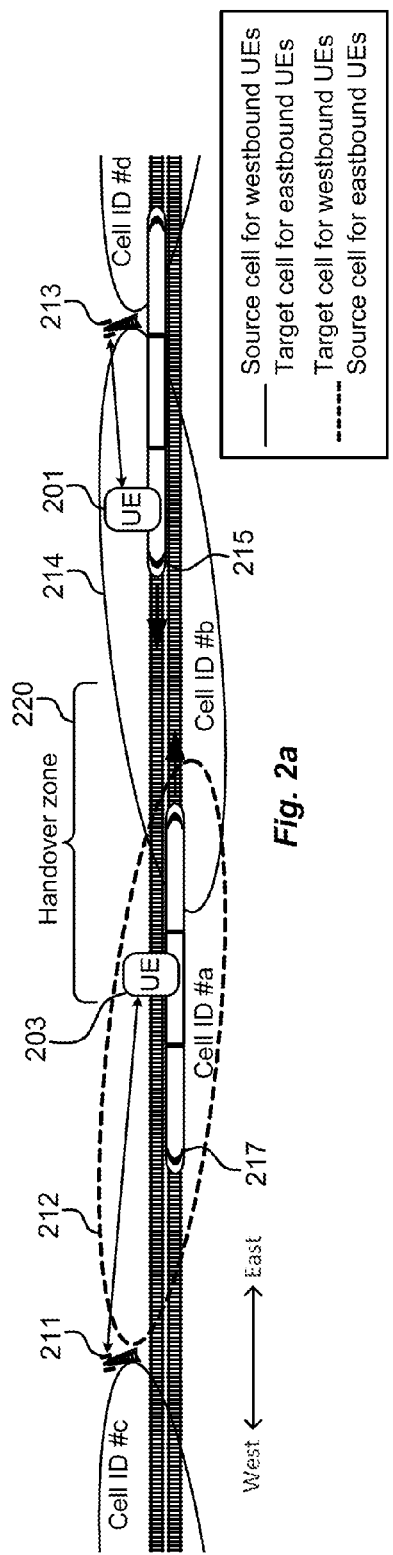
FIGS. 2a-b schematically illustrate handover associated with a moving UE.
Figure 2B:
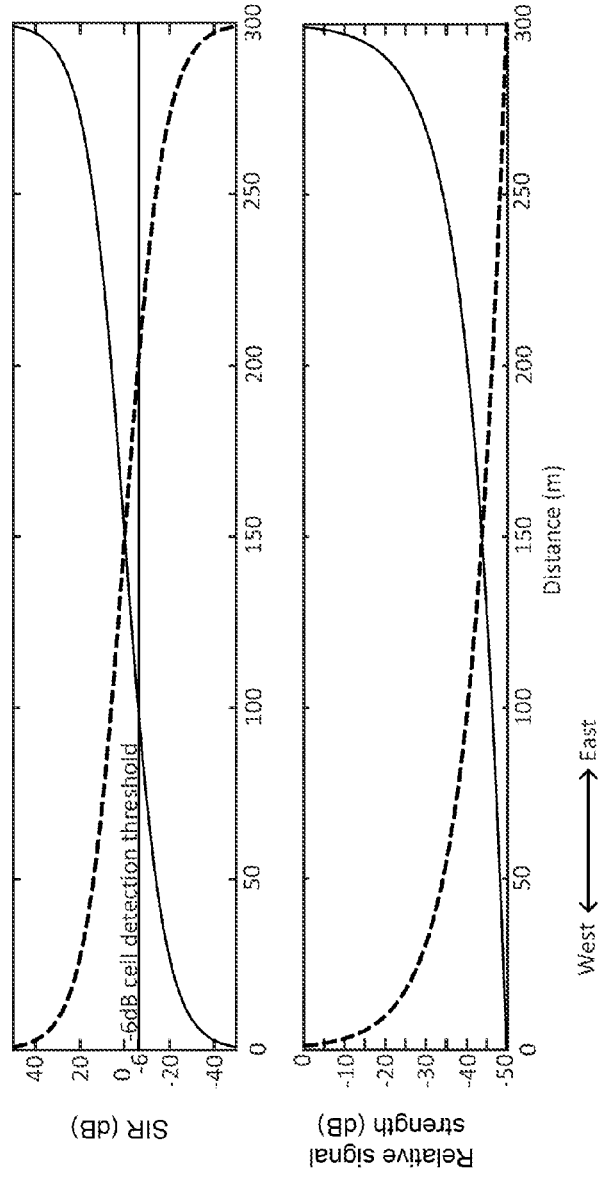

FIGS. 2a-b schematically illustrate drawbacks associated with prior art handover procedures for 300 m inter-site distance. In FIG. 2a an antenna node 211 defines a cell 212 and an antenna node 213 defines a cell 214 and the inter-site distance is defined by the distance between antenna node 211 and antenna node 213. A UE 201 is onboard a westbound train 215 and a UE 203 is onboard an eastbound train 217. The diagrams in FIG. 2b are aligned with FIG. 2a such that the east-west distance markers in FIG. 2b are lined up with corresponding points in FIG. 2a. For example, antenna node 211 is located at distance marker 0 m and antenna node 213 is located at distance marker 300 m.

For a UE in RRC connected mode (in relation to a source cell) to detect an intra-frequency neighbor cell the SINR must be above −6 dB. Considering for instance the UE 201 on the westbound train 215, which is connected mode in relation to the cell 214, it is not until the UE 201 is about 100 m away from the source cell 214 (i.e. at distance marker 200 m in the upper diagram of FIG. 2b) that the SINR of a target cell (which in the scenario of FIG. 2a is cell 212) comes into the range where the UE 201 shall be able to detect it. After approximately 100 m further in the westward direction (i.e. at distance marker 100 m in the upper diagram of FIG. 2b), the source cell 214 SINR falls below −6 dB while the target cell 212 has improved significantly. As indicated in FIG. 2a, a handover zone 220 is defined as being between these two distance markers 100 m east of the antenna node 211 and 100 m west of antenna node 213. The UE 201 will be within this handover zone 220 for about 700 ms when travelling at 500 km/h, while the cell detection requirements in 3GPP TS 36.133 state that the UE shall be able to detect and report a new neighbor cell that fulfills the side conditions within 800 ms. The scenario is further complicated by that there may be several kHz frequency offset between source and target cells due to Doppler shifts with opposite signs.

UE demodulation performance degrades significantly when the SINR decreases, and already at SINR −4 dB it becomes challenging for a legacy UE to receive a handover command from a source cell. Thus the available time for handing off the UE (i.e. a procedure including: UE detecting neighbor cell, UE reporting neighbor cell, network node reconfiguring the UE to handover to target cell) is considerably less than assumed in the standard, and there is a significant risk that the UE, once it has reported the target cell, cannot receive the handover command from the source cell due to high interference.

It shall be noted, as illustrated by the signal strength diagram in the lower part of FIG. 2b, that for increased inter-site distance the handover zone becomes wider due to the inverse relationship between signal strength and squared propagation distance. Vice versa the handover zone becomes smaller for decreased inter-site distance.

It is to be noted that here and in all other parts of the present disclosure, "source cell" may also be denoted serving cell, primary cell, PCell, primary secondary cell, PSCell, current cell etc. Similarly, "target cell" may be denoted neighbour cell, new source or serving cell, non-serving cell etc. Moreover, depending on scenario, the UE may be served by single source cell or in multiple source cells (e.g. in scenarios involving carrier aggregation, dual connectivity etc).

Turning now to FIG. 3 and FIGS. 4a-i, embodiments of a method in a network node will be described in some more detail.

It is to be noted that, in the present disclosure, generic terms in the form of "network node" and "UE" are used. However, non-limiting examples of network nodes include: antenna node, Node B, enhanced NodeB, e-NodeB, radio network controller, RNC, base station, base station controller, BSC, access point, base transceiver station, BTS, remote radio head, RRH, remote radio unit, RRU, relay, core network node etc. Similarly, UE may be any type of wireless device capable of communicating with a network node and/or with another wireless device over a wireless link. Non-limiting examples of UE are mobile terminal, laptop. USB device, embedded device, machine type communication, MTC, or machine-to-machine, M2M, capable, device-to-device, D2D, capable UE aka proximity service, ProSe, UE etc.

Figure 3:
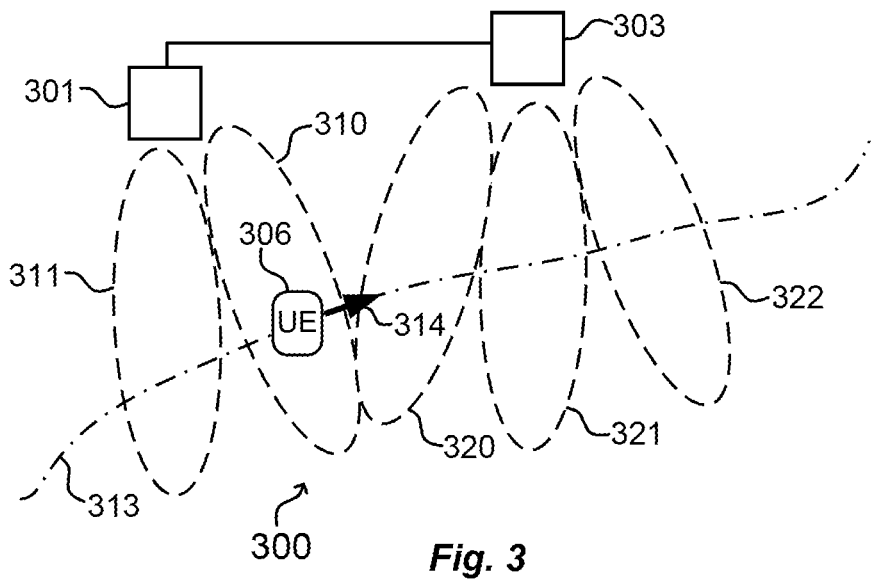
FIG. 3 schematically illustrates a network.

FIG. 3 illustrates a network 300 and where a UE 306 is moving in a direction 314 along a path 313, e.g. onboard a high-speed train as discussed above. The UE is in connection with a network node 301 in a source cell 310 that is maintained by the network node 301. FIG. 3 also shows a network node 303 that maintains cells 320, 321 and 322. As will be discussed below, cells 320, 321 and 322 may become target cells for the UE 306 in a handover from the source cell 310.

Figure 4A:
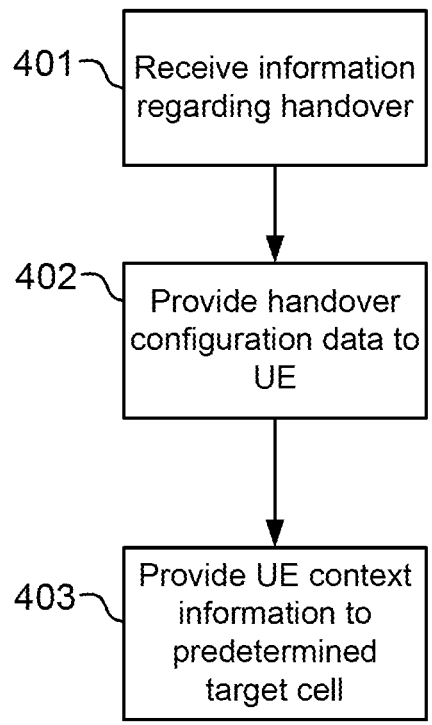

Embodiments of a method in the network node 301 will be described, referring to FIG. 4a, in terms of a number of steps or actions.

Action 401

The network node 301 receives, from at least one cell in the network 300, data that comprises information regarding UE handover, whereby the at least one cell in the network from which the data is received defines at least one predetermined target cell to which a UE 306 is to perform handover.

For example, the data may be received via the network node 303 from any of cells 320, 321, 322.

Action 402

The network node 301 provides, to the UE 306, handover configuration data comprising the data received from the at least one cell and comprising at least one event triggering condition that defines radio signal measurement conditions for use by the UE when performing an autonomous decision to initiate the handover.

Action 403

The network node 301 provides, to the at least one predetermined target cell, context information associated with the UE 306 for preparing the target cell for a handover procedure initiated by the UE.

In other words, the present disclosure introduces a new kind of handover where the UE is pre-configured by the network node of the source cell with one or more target cells and associated conditions to be fulfilled for the UE to autonomously decide when to execute the handover. The UE may be pre-configured while in good radio conditions, being connected to the source cell, and hence the UE does not risk going out of source cell coverage before being handed over to a target cell.

The target cell is also pre-configured by the network node in the source cell at an earlier time than in prior art procedures. This means that the source cell provides information to the target cell on UE context necessary to execute the handover, and the target cell provides configuration information to the network node of source cell, which is indicated to the UE enabling the UE to become pre-configured while the UE is still in good radio conditions in connection with the network node of the source cell. In this way, the target cell has been made aware to expect an inbound handover from the UE at some point in the future, and the target cell has all necessary information to maintain the connection when this occurs, and correspondingly the UE has all necessary information to make a connection to the target cell autonomously when the trigger condition occurs.

The at least one event triggering condition that is provided to the UE 306 in action 402 may be configured for triggering any event of:

event AX being triggered by the UE based on an outcome of a comparison of signal measurements performed by the UE on the source cell and the at least one predetermined target cell, and event AY being triggered by the UE based on an outcome of a comparison of a signal measurement performed by the UE on the source cell with a first threshold, and based on an outcome of a comparison of a signal measurement performed by the UE on the at least one predetermined target cell with a second threshold.

In other words, the event AX may be seen as a preconfigured target PCell becoming offset better than serving PCell, remembering that here and in all other parts of the present disclosure, "source cell" may also be denoted serving cell, primary cell, PCell, primary secondary cell, PSCell, current cell etc. Similarly, "target cell" may be denoted neighbour cell, new source or serving cell, non-serving cell etc.

The UE shall for associated preconfigured target PCell:
Consider the entering condition for this event to be satisfied when $$Mn+Ofn+Ocn-Hys>Mp+Ofp+Ocp+Off$$

is fulfilled;
Consider the leaving condition for this event to be satisfied when $$Mn+Ofn+Ocn+Hys<Mp+Ofp+Ocp+Off$$

is fulfilled;
The variables in these formulas are defined as follows:
Mn is the measurement result of the neighbouring cell, not taking into account any offsets.
Ofn is the frequency specific offset of the frequency of the neighbour cell (i.e. offsetFreq as defined within measObjectEUTRA corresponding to the frequency of the neighbour cell).

Ocn is the cell specific offset of the neighbour cell (i.e. cellIndividualOffset as defined within measObjectEUTRA corresponding to the frequency of the neighbour cell), and set to zero if not configured for the neighbour cell.

Mp is the measurement result of the PCell, not taking into account any offsets.

Ofp is the frequency specific offset of the primary frequency (i.e. offsetFreq as defined within measObjectEUTRA corresponding to the primary frequency).

Ocp is the cell specific offset of the PCell (i.e. cellIndividualOffset as defined within measObjectEUTRA corresponding to the primary frequency), and is set to zero if not configured for the PCell.

Hys is the hysteresis parameter for this event (i.e. hysteresis as defined within reportConfigEUTRA for this event).

Off is the offset parameter for this event (i.e. a3-Offset as defined within reportConfigEUTRA for this event).

Mn, Mp are expressed in dBm in case of RSRP, or in dB in case of RSRQ.

Ofn, Ocn, Ofp, Ocp, Hys, Off are expressed in dB.

Furthermore, the event AY may be seen as a PCell becomes worse than thresh1 and preconfigured PCell becomes better than thresh2. That is:

The UE shall for associated preconfigured PCell:
Consider the entering condition for this event to be satisfied when both $$Mp+Hys<Thresh1$$

and $$Mn+Ofn+Ocn-Hys>Thresh2$$

are fulfilled;
Consider the leaving condition for this event to be satisfied when either or both of $$Mp-Hys>Thres1$$

and $$Mn+Ofn+Ocn+Hys<Thresh2$$

are fulfilled;
The variables in the formula are defined as follows:
Mp is the measurement result of the PCell, not taking into account any offsets.
Mn is the measurement result of the neighbouring cell, not taking into account any offsets.
Ofn is the frequency specific offset of the frequency of the neighbour cell (i.e. offsetFreq as defined within measObjectEUTRA corresponding to the frequency of the neighbour cell).

Ocn is the cell specific offset of the neighbour cell (i.e. cellIndividualOffset as defined within measObjectEUTRA corresponding to the frequency of the neighbour cell), and set to zero if not configured for the neighbour cell.

Hys is the hysteresis parameter for this event (i.e. hysteresis as defined within reportConfigEUTRA for this event).

Thresh1 is the threshold parameter for this event (i.e. a5-Threshold1 as defined within reportConfigEUTRA for this event).

Thresh2 is the threshold parameter for this event (i.e. a5-Threshold2 as defined within reportConfigEUTRA for this event).

Mn, Mp are expressed in dBm in case of RSRP, or in dB in case of RSRQ.

Ofn, Ocn, Hys are expressed in dB.

Thresh1 is expressed in the same unit as Mp.

Thresh2 is expressed in the same unit as Mn.

Figure 4B:
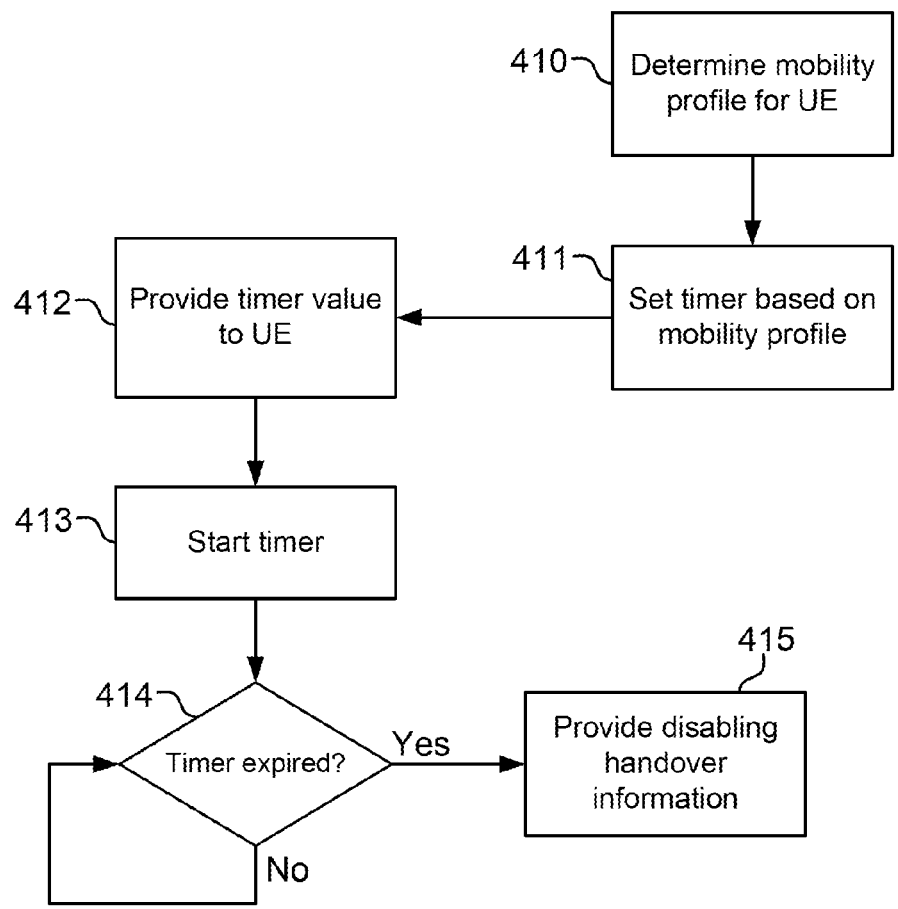

Some embodiments involve handover configuration data that comprises a timer value that specifies a time period during which the UE is allowed to initiate the handover procedure. These are illustrated in FIG. 4b:

Action 412

The network node 301 provides the timer value to the UE 306.

Action 413

A timer is started, using the timer value.

Action 414 and 415

The network node 301 provides, to the at least one predetermined target cell, if the UE has not initiated a handover procedure prior to the timer expiring, information that disables the UE from being handed over to the at least one predetermined target cell.

In some embodiments, the provision of the timer value to the UE in action 412 is conditioned on a mobility profile as follows.

Action 410

The network node 301 determines a mobility profile for the UE, the mobility profile comprising at least one movement criterion associated with the UE.

Action 411

The network node 301 sets the timer value based on the at least one movement criterion.

In these embodiments, for example, the timer value to be applied by the UE 306 upon having decoded, e.g., a RRC message carrying the handover configuration data may be provided. If the UE 306 has not initiated the handover before the timer expires it is no longer granted to do the handover autonomously and resources in target cell(s) may, e.g., be de-allocated by the source cell. The timer value may be selected by the network node based on UE mobility profile (e.g. UE trail, position, UE velocity, Doppler frequency, change in Doppler frequency, direction of motion, acceleration or change of velocity etc.) and/or knowledge about the infrastructure, e.g., whether UEs are bound to follow a railway track.

Moreover, in order to prevent radio link failure to be triggered while the UE is about to carry out an autonomous handover, one additional timer value that overrides the standardized value for radio link failure may be provided by the network. In such examples, the UE shall not initiate reestablishment before this timer has expired.

Figure 4C:
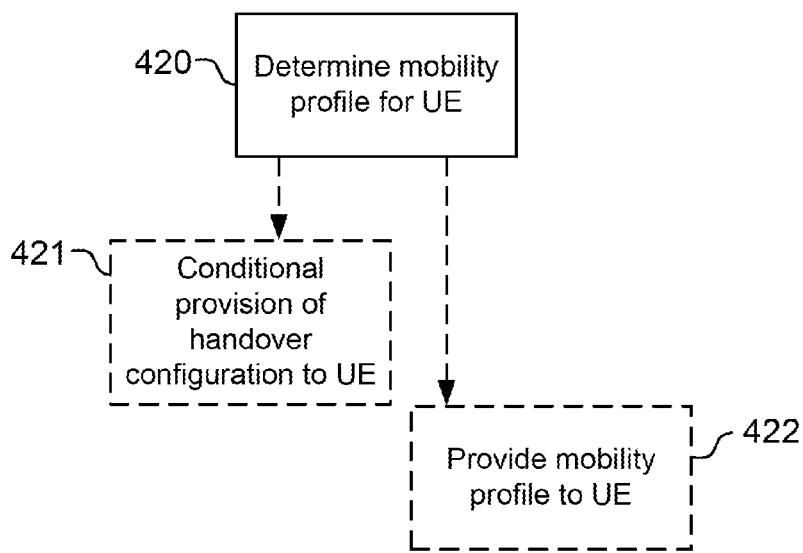

Some embodiments are illustrated in FIG. 4c, comprising:

Action 420

The network node 301 determines a mobility profile for the UE, the mobility profile comprising at least one movement criterion associated with the UE.

Action 421

The provision of the handover configuration data to the UE is made conditional of the at least one movement criterion.

Action 422

The network node provides the mobility profile to the UE.

In these embodiments, for example, the network node may configure the UE 306 with the handover configuration information provided that the UE mobility profile as determined by the network node meets one or more criteria. The network node can determine the UE mobility profile based on signals received from the UE and/or UE mobility profile information transmitted by the UE to the network node.

In the embodiments illustrated in FIG. 4c, the at least one movement criterion associated with the UE comprises any of:

a speed of the UE is above a speed threshold, a maximum Doppler frequency associated with radio signals transmitted by and/or received by the UE is above a Doppler frequency threshold, a rate of change of direction of the UE is above a rate of change of direction threshold, and a determination of whether or not the UE is operating in a high speed train environment.

In these embodiments, for example, the criteria for the UE mobility profile can be pre-defined or the UE may be configured by the network node. Non-limiting examples of the criteria related to UE mobility profile for triggering the handover are:

UE speed is above a threshold e.g. 300 km/hour,

Maximum Doppler frequency is above a threshold e.g. magnitude of maximum Doppler frequency is above 1000 Hz, Rate of change of direction of the UE is above a threshold e.g. 5 degrees per second.

For example, the criteria for the UE mobility profile may also be associated with a particular deployment scenario related to high speed train environment. For example the autonomous handover procedure may be applied only when the UE operates in a network deployed for high speed train environment. The UE 306 may determine that it is operating in high speed train environment based on explicit information received from the network node e.g. indicator sent to the UE 306 that cells on certain carrier, f1, belong to high speed train environment. Therefore the UE 306 may execute the new handover procedure only if the target cell operates in high speed train environment as indicated by an indicator signalled by the network node 301.

Figure 4D:
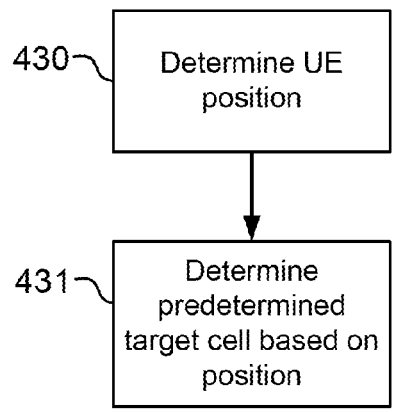

Some embodiments are illustrated in FIG. 4d, comprising:

Action 430

The network node 301 determines a position of the UE 306.

Action 431

The network node 301 determines the at least one predetermined target cell based on a preconfigured set of likely candidate cells depending on the determined position of the UE 306.

In such embodiments, for example, the UE 306 may be prevented from going out of coverage and thereby losing connection due to radio link failure when the source cell coverage suddenly is lost, either due to the share speed of the UE 306, or due to the UE 306 being located in an urban environment for instance passing a corner by which the UE 306 suddenly might get into line-of-sight to a strong intra-frequency neighbour cell by which the serving cell might drown in interference, with radio link failure as result. For areas where such radio link failures arise frequently the serving cell may configure one or more likely candidate cells for handover, and preconfigure the UE with those.

Figure 4E:
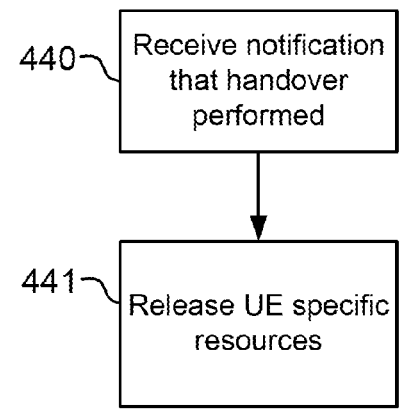

Some embodiments are illustrated in FIG. 4e, comprising:

Action 440

The network node 301 receives, from one target cell among the at least one predetermined target cells, a notification that the UE 306 has performed a handover procedure associated with the one target cell.

Action 441

As a consequence of the notification, the network node 301 releases UE-specific resources associated with the source cell and releasing UE-specific resources associated with any predetermined target cell with which the UE has not performed a handover procedure.

In such embodiments, for example, if a preconfigured target cell becomes stronger than the serving cell (potentially with a configured offset), the UE 306 autonomously may carry out random access and/or transmit a scheduling requests in the target cell. The target network node may notify the source network node, which then can release UE-specific resources both in the source cell and the remaining preconfigured target cells, should there be any. A similar procedure may be applied in case the serving cell is lost.

Figure 4F:
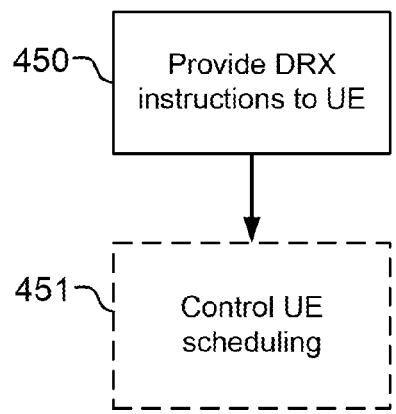

Some embodiments are illustrated in FIG. 4f, comprising:

Action 450

The network node 301 provides, to the UE, an instruction not to apply discontinuous reception, DRX, or an instruction to apply a specific discontinuous reception, DRX, cycle.

In some of these embodiments:

Action 451

The network node 301, controls scheduling of the UE such that a rate of reduction of amounts of data in data buffers in the UE is increased.

In these embodiments, for example, the network node 301 may reconfigure the UE 306 with a suitable DRX cycle (or non-DRX) when providing the handover configuration data, in order for the UE 306 to carry out cell detection quick enough for the scenario. For instance, in high-speed train scenarios it is desirable that the UE 306 measures as had it been non-DRX or DRX cycle length up to 40 ms. Alternatively, when the UE 306 gets preconfigured with a target cell for doing possible handover to the target cell, it shall measure for instance according to non-DRX requirements or according to shorter DRX requirements (e.g. DRX cycle below 80 ms). In this case the network node 301 may assume that the UE 306 even if configured in DRX starts operating in non-DRX or shorter DRX cycle from the instance the UE 306 is preconfigured with the target cell until the handover is executed. The network node 301 may also adapt scheduling for the UE during this time when the UE 306 goes into non-DRX or shorter DRX. For example the network node 301 may schedule the UE 306 more frequently during this phase. This will allow the serving cell to empty the UE buffer and avoid the loss of data during a handover phase.

Figure 4G:
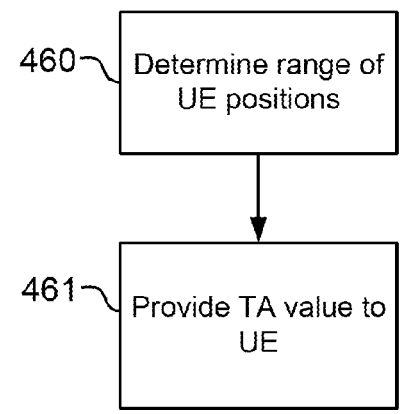

Some embodiments are illustrated in FIG. 4g, comprising:

Action 460

The network node 301 determines a range of positions of the UE 306 in relation to the source cell and the at least one predetermined target cell, the range of positions defining a range in which the handover procedure is to be performed.

Action 461

The network node 301 provides, to the UE 306, based on the range of positions, data comprising at least one timing advance, TA, value for use in the at least one predetermined target cell.

In such embodiments, for example, the handover configuration data may carry information on timing advance to be applied in the target cell, where the timing advance is based on estimated range of UE positions where the handover is to be executed. This could be estimated by a network node (such as the serving or target eNB) in advance of the handover. The UE position where handover is executed in turn depends e.g. on UE relative measurement accuracy, UE mobility profile (e.g. UE velocity), and acceptable UL timing tolerance (generally ±1-2 μs). For inter-site distance of 300 m the timing advance may vary within 1 μs depending on UE position assuming equally strong cells and no handover measurement offset being used, whereas for larger inter-site distance it is bigger.

Some embodiments are illustrated in FIG. 4h, comprising:

Action 470

The network node 301 determines at least one system frame number, SFN, offset between a SFN associated with the source cell and a SFN associated with the at least one predetermined target cell, Action 471

The provision of the handover configuration data to the UE 306 in action 402 then comprises providing, to the UE, data comprising the at least one SFN offset for use in the at least one predetermined target cell.

The UE 306 uses the SFN in order to apply configurations for reporting, DRX, measurement gaps, sounding reference signal, SRS, hybrid automatic repeat request, HARQ, processing etc. Therefore according to legacy handover procedures the UE has to read the MIB to acquire SFN as part of the handover.

In contrast, and in embodiments as described herein, for example, the handover configuration data may carry also an SFN offset between source and target cell(s), such that the UE 306 can skip the MIB reading and apply the cell-specific configurations some 20-30 ms earlier than otherwise possible. In a synchronous network the SFN offset between source and target cells is fixed. In an asynchronous network the SFN offset between the source and target cell(s) may drift with time and may be determined by network nodes.

Some embodiments are illustrated in FIG. 4i, comprising:

Action 480

The network node 301 receives, from the UE 306, capability information that the UE is capable of performing an autonomous decision to initiate a handover.

Action 481

The provision of the handover configuration data to the UE in action 402 is then conditional of the received capability information.

In such embodiments, for example, the fact is recognized that all UEs may not be capable of supporting the use of handover configuration data as described herein. The UE 306 supporting the use of handover configuration data as described herein may indicate that it is capable of handling the new handover procedure to the network node (e.g. base station, access point, MME etc). The UE 306 may send this the capability report or message to the network node 301 autonomously or in response to a request (e.g. UE capability inquiry message) received from the network node 301. The network node 301 may use the received UE capability message for one or more operations. For example the network node 301 may configure the UE 306 with the handover configuration data only if the UE 306 supports such capability. The network node 301 may also determine the UE mobility profile and configure the UE 306 with one or more thresholds or conditions related to the UE mobility profile for triggering the new handover procedure, e.g. UE speed, maximum Doppler frequency etc.

Figure 5A:
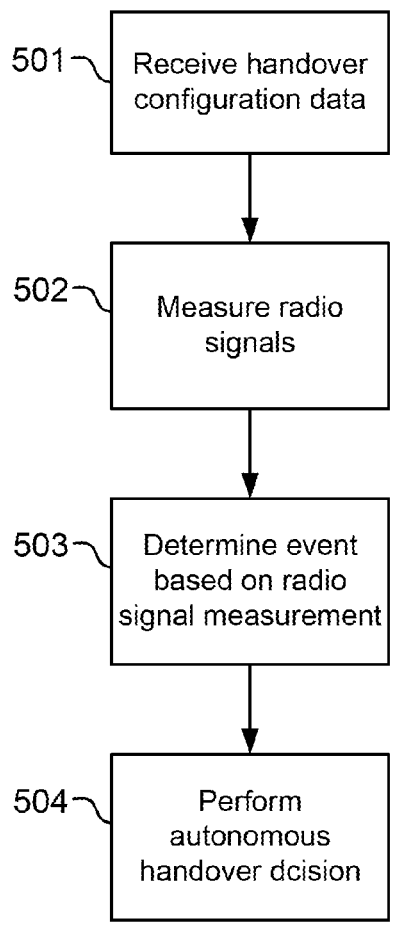
FIGS. 5a-g are flowcharts of embodiments of a method in a UE.

Embodiments of a method in the UE 306 will be described, referring to FIG. 5a, in terms of a number of steps or actions:

Action 501

The UE 306 receives, from the network node 301, handover configuration data that comprises information regarding UE handover to at least one predetermined target cell to which the UE is to perform handover and at least one event triggering condition that defines radio signal measurement conditions for use by the UE when performing an autonomous decision to initiate the handover.

Action 501

The UE 306 measures radio signals associated with the source cell and radio signals associated with the at least one predetermined target cell.

Action 503

The UE 306 determines, based on the measuring of radio signals, an event according to the at least one event triggering condition.

Action 504

The UE 306 performs, based on the determined event, an autonomous decision to initiate handover to the at least one predetermined target cell.

The at least one event triggering condition that is received by the UE 306 in action 501 may be configured for triggering any event of:
- event AX being triggered by the UE based on an outcome of a comparison of signal measurements performed by the UE on the source cell and the at least one predetermined target cell, and
- event AY being triggered by the UE based on an outcome of a comparison of a signal measurement performed by the UE on the source cell with a first threshold, and based on an outcome of a comparison of a signal measurement performed by the UE on the at least one predetermined target cell with a second threshold.

As described above in connection with the embodiments of a method performed by the network node 301, the event AX may be seen as a preconfigured target PCell becoming offset better than serving PCell and the event AY may be seen as a PCell becomes worse than thresh1 and preconfigured PCell becomes better than thresh2.

Figure 5B:
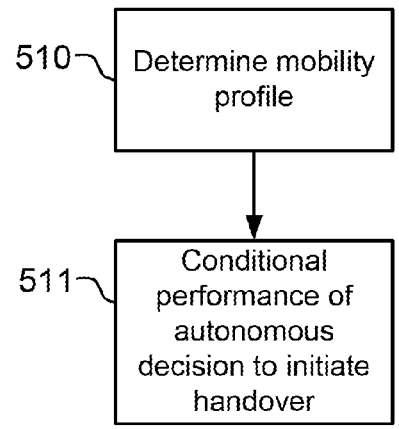

Some embodiments are illustrated in FIG. 5b, comprising:

Action 510

The UE 306 determines a mobility profile for the UE, the mobility profile comprising at least one movement criterion associated with the UE.

For example, the determination of the mobility profile for the UE may comprise receiving the mobility profile from the network node 301.

As above, the at least one movement criterion associated with the UE may comprise any of:
- a speed of the UE is above a speed threshold,
- a maximum Doppler frequency associated with radio signals transmitted by and/or received by the UE is above a Doppler frequency threshold,
- a rate of change of direction of the UE is above a rate of change of direction threshold, and
- a determination of whether or not the UE is operating in a high speed train environment.

Action 511

The performing of the autonomous decision to initiate handover is then conditional of the at least one movement criterion.

In these embodiments, for example, the network node may configure the UE with the handover configuration data but the UE may only initiate the handover provided that the UE mobility profile as determined by the UE meets one or more criteria. The UE can determine the UE mobility profile based on signals received from the network node and/or UE mobility profile information transmitted by the network node to the UE.

Figure 5C:
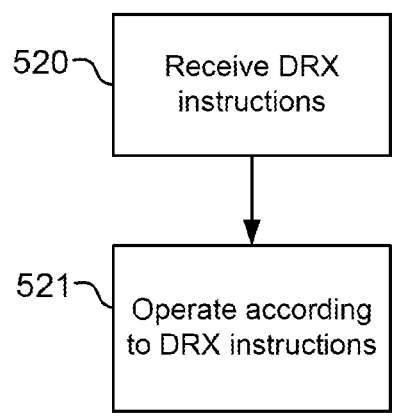

Some embodiments are illustrated in FIG. 5c, comprising:

Action 520

The UE 306 receives, from the network node 301, an instruction not to apply discontinuous reception, DRX, or an instruction to apply a specific discontinuous reception, DRX, cycle.

Action 521

The UE 306 operates in accordance with the received DRX instructions.

In these embodiments, for example, the network node 301 may reconfigure the UE 306 with a suitable DRX cycle (or non-DRX) when providing the handover configuration data, in order for the UE 306 to carry out cell detection quick enough for the scenario. For instance, in high-speed train scenarios it is desirable that the UE 306 measures as had it been non-DRX or DRX cycle length up to 40 ms. Alternatively, when the UE 306 gets preconfigured with a target cell for doing possible handover to the target cell, it shall measure for instance according to non-DRX requirements or according to shorter DRX requirements (e.g. DRX cycle below 80 ms). In this case the network node 301 may assume that the UE 306 even if configured in DRX starts operating in non-DRX or shorter DRX cycle from the instance the UE 306 is preconfigured with the target cell until the handover is executed. The network node 301 may also adapt scheduling for the UE during this time when the UE 306 goes into non-DRX or shorter DRX. For example the network node 301 may schedule the UE 306 more frequently during this phase. This will allow the serving cell to empty the UE buffer and avoid the loss of data during a handover phase.

Figure 5D:
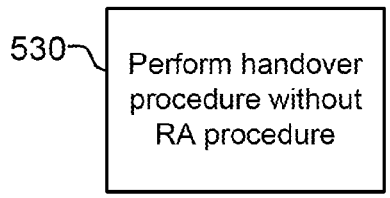

In some embodiments that are illustrated in FIG. 5d, the reception of the handover configuration data comprises reception of at least one timing advance, TA, value for use in the at least one predetermined target cell.

Action 530

The UE 306 performs a handover procedure with the at least one predetermined target cell, wherein the handover procedure comprises requesting a scheduling grant without performing a random access, RA, procedure.

In such embodiments, for example, when a target cell TA value is provided to the UE 306, the UE 306 can bypass a random access procedure and immediately request a scheduling grant. Thereby the handover procedure as such can be significantly shortened since the random access part of it may take up to 50 ms even if the first attempt is successful. Moreover, in case no timing advance is provided to the UE 306, the UE 306 may carry out contention-free random access to the preconfigured target cell so as to acquire the appropriate timing advance to apply in a way similar to how it is done in the legacy handover procedure.

Figure 5E:
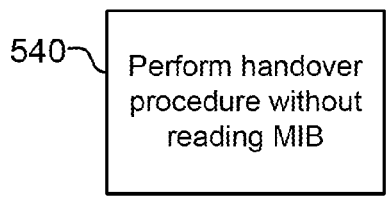

In some embodiments that are illustrated in FIG. 5e, the reception of the handover configuration data comprises reception of at least one system frame number, SFN, offset between a SFN associated with the source cell and a SFN associated with the at least one predetermined target cell.

Action 540

The UE 306 performs a handover procedure with the at least one predetermined target cell, wherein the handover procedure comprises requesting a scheduling grant without reading a master information block, MIB, associated the at least one predetermined target cell.

As mentioned above, the UE 306 uses the SFN in order to apply configurations for reporting, DRX, measurement gaps, sounding reference signal, SRS, hybrid automatic repeat request, HARQ, processing etc. Therefore according to legacy handover procedures the UE has to read the MIB to acquire SFN as part of the handover.

In contrast, and in embodiments as described herein, for example, the handover configuration data may carry also an SFN offset between source and target cell(s), such that the UE 306 can skip the MIB reading and apply the cell-specific configurations some 20-30 ms earlier than otherwise possible. In a synchronous network the SFN offset between source and target cells is fixed. In an asynchronous network the SFN offset between the source and target cell(s) may drift with time and may be determined by network nodes.

In case no SFN offset is provided, the UE may acquire the SFN of the preconfigured target cell similar to how it is done in a legacy handover procedure.

Figure 5F:
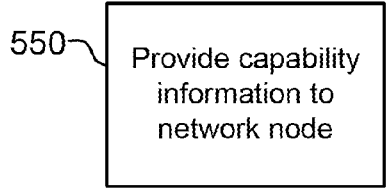

Some embodiments are illustrated in FIG. 5f, comprising:

Action 550

The UE 306 provides, to the network node 301, capability information that the UE is capable of performing an autonomous decision to initiate a handover.

In such embodiments, for example, the fact is recognized that all UEs may not be capable of supporting the use of handover configuration data as described herein. The UE 306 supporting the use of handover configuration data as described herein may indicate that it is capable of handling the new handover procedure to the network node (e.g. base station, access point, MME etc). The UE 306 may send this the capability report or message to the network node 301 autonomously or in response to a request (e.g. UE capability inquiry message) received from the network node 301. The network node 301 may use the received UE capability message for one or more operations. For example the network node 301 may configure the UE 306 with the handover configuration data only if the UE 306 supports such capability. The network node 301 may also determine the UE mobility profile and configure the UE 306 with one or more thresholds or conditions related to the UE mobility profile for triggering the new handover procedure, e.g. UE speed, maximum Doppler frequency etc.

Figure 5G:
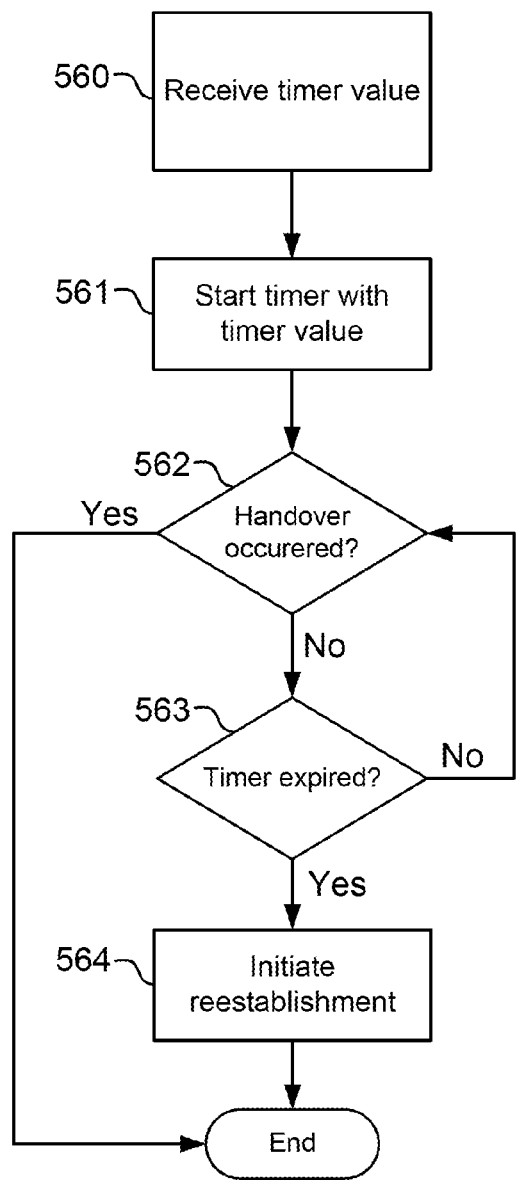

Some embodiments are illustrated in FIG. 5g, comprising:

Action 560

The UE 306 receives, from the network node 301, a timer value.

Action 561

The UE 306 starts a timer using the timer value.

Actions 562-564

The UE 306 initiates, if not a handover has occurred (as checked in action 562) before the timer has expired (as checked in action 563), a reestablishment procedure in action 564.

In these embodiments, for example, the timer value to be applied by the UE 306 upon having decoded, e.g., a RRC message carrying the handover configuration data may be provided. If the UE 306 has not initiated the handover before the timer expires it is no longer granted to do the handover autonomously and resources in target cell(s) may, e.g., be de-allocated by the source cell. The timer value may be selected by the network node based on UE mobility profile (e.g. UE trail, position, UE velocity, Doppler frequency, change in Doppler frequency, direction of motion, acceleration or change of velocity etc.) and/or knowledge about the infrastructure, e.g., whether UEs are bound to follow a railway track.

Moreover, in order to prevent radio link failure to be triggered while the UE is about to carry out an autonomous handover, one additional timer value that overrides the standardized value for radio link failure may be provided by the network. In such examples, the UE shall not initiate reestablishment before this timer has expired.

Figure 6:
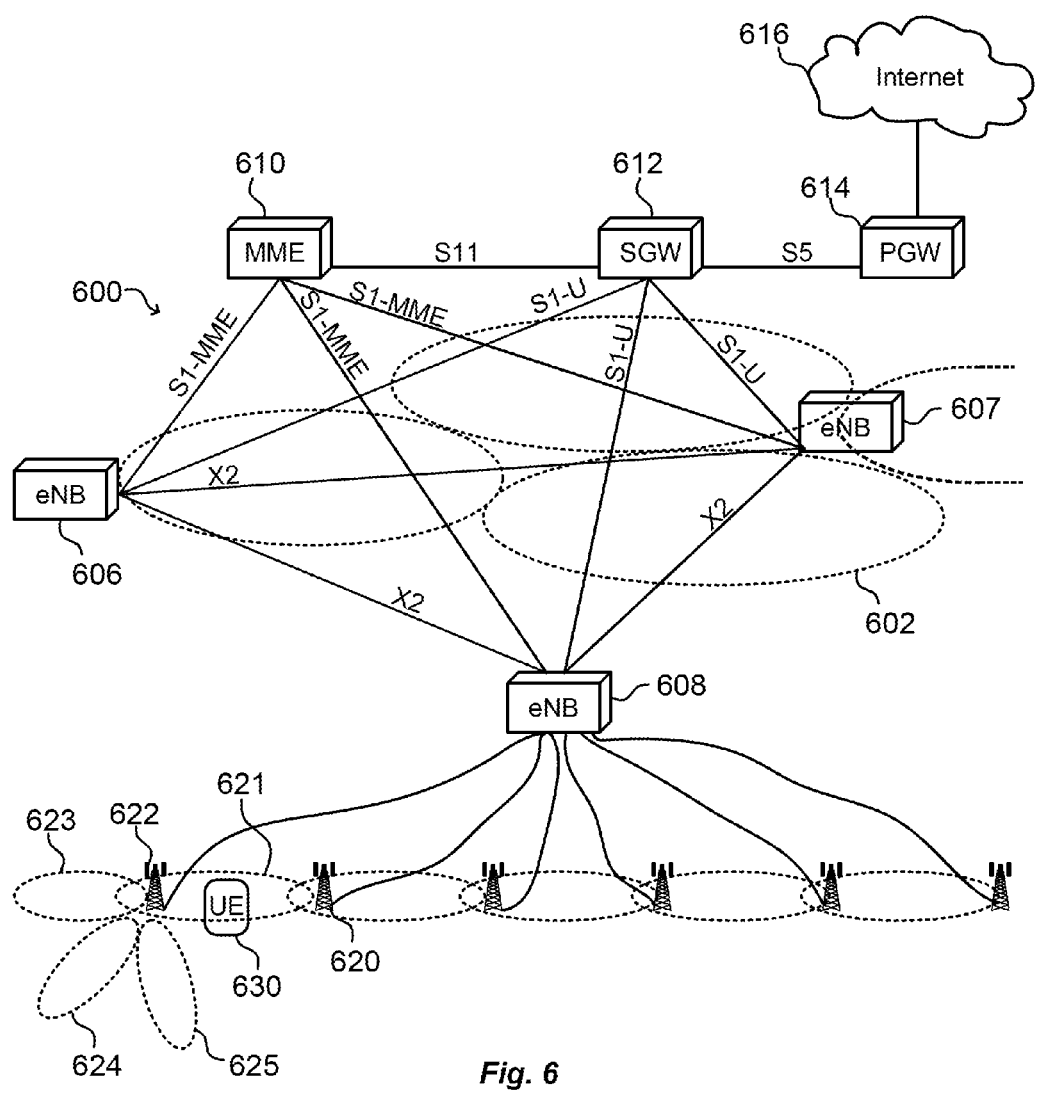
FIG. 6 schematically illustrates a wireless communication system.

Turning now to FIG. 6, which illustrates parts of a 3GPP long term evolution, LTE, wireless network 600 in which the embodiments described herein may be realized. Base stations (enhanced NodeB, eNodeB or eNB) 606, 607, 608 are communicating with each other over an X2 interface, and here e.g. exchange information on UEs to be handed over, and forwards user plane data packets from a source to a target cell. The base stations 606, 607 and 608 are connected to a mobility management entity, MME, 610, which keeps information about UEs (e.g. UE contexts) regarding capabilities etc., which the MME 610 shares, e.g., with base stations connected to it. The MME 610 is also managing handover of a UE from one MME to another when a UE leaves the pool of base stations managed by a source MME, or when the X2 connection is missing between the source and target base stations.

The base stations 606, 607 and 608 are further connected to a serving gateway, SGW, 612, which is handing the user data plane transport to and from the base station to which a UE is connected, and to one or more packet data network gateways, PGW, 614, which connect UEs to the internet 616. The MME in whose pool of base stations a UE resides configures which base station the SGW shall connect to for transport of the UE user plane data.

In FIG. 6, the base station 608 may be a network node as defined above and the base station/network node 608 is connected to a number of antenna nodes 620, 622. The base station/network node 608 may control the antenna nodes 620, 622 such that antenna node 620 maintains a source cell 621 and antenna node 622 maintains a number of cells 623, 624 and 625 that may be a target cell as described herein. A UE 630 is illustrated, which may correspond to any UE described herein.

Figure 7:
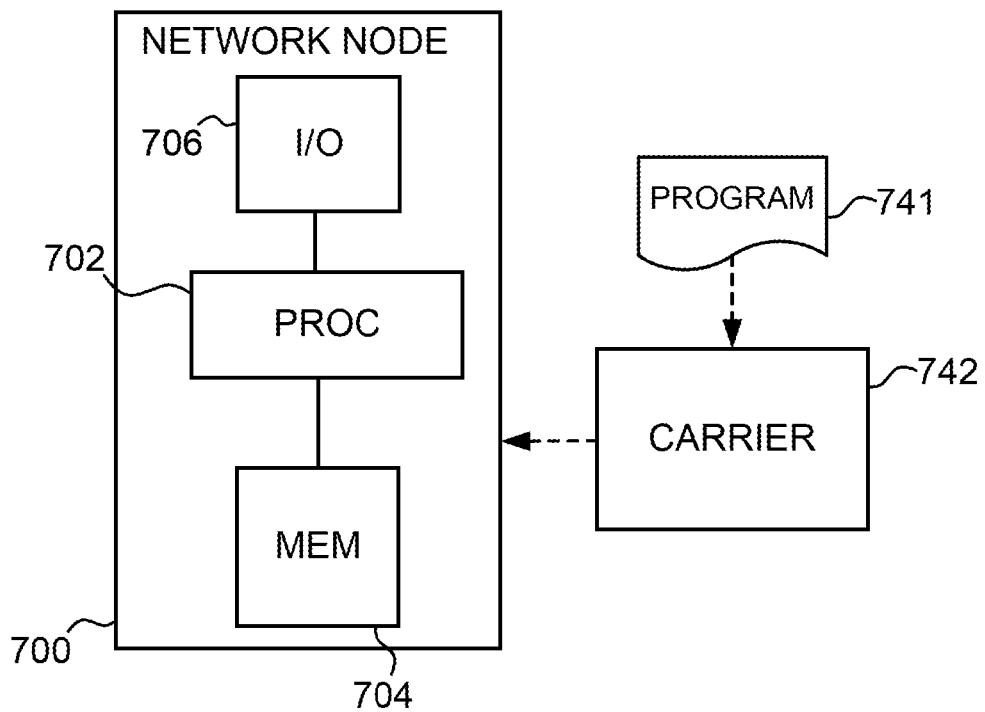
FIG. 7 schematically illustrates a network node.

Turning now to FIG. 7, further embodiments of a network node will be described in some more detail. FIG. 7 schematically illustrates a network node 700 comprising input/output circuitry 706, a processor 702 and a memory 704. The memory 704 contains instructions executable by the processor 702 whereby the network node 700 is operative to:

receive, from at least one cell in the network, data that comprises information regarding handover, whereby the at least one cell in the network from which the data is received defines at least one predetermined target cell to which a UE is to perform handover, provide, to the UE, handover configuration data comprising the data received from the at least one cell and comprising at least one event triggering condition that defines radio signal measurement conditions for use by the UE when performing an autonomous decision to initiate the handover, and provide, to the at least one predetermined target cell, context information associated with the UE for preparing the target cell for a handover procedure initiated by the UE.

The instructions that are executable by the processor 702 may be software in the form of a computer program 741. The computer program 741 may be contained in or by a carrier 742, which may provide the computer program 741 to the memory 704 and processor 702. The carrier 742 may be in any suitable form including an electronic signal, an optical signal, a radio signal or a computer readable storage medium.

In some embodiments, the network node 700 is operative such that the at least one event triggering condition is configured for triggering any event of:

event AX being triggered by the UE based on an outcome of a comparison of signal measurements performed by the UE on the source cell and the at least one predetermined target cell, event AY being triggered by the UE based on an outcome of a comparison of a signal measurement performed by the UE on the source cell with a first threshold, and based on an outcome of a comparison of a signal measurement performed by the UE on the at least one predetermined target cell with a second threshold.

In some embodiments, the network node 700 is operative such that the handover configuration data comprises a timer value that specifies a time period during which the UE is allowed to initiate the handover procedure, and where the method comprises:
  providing, to the UE, the timer value,
  starting a timer using the timer value,
  providing, to the at least one predetermined target cell, if the UE has not initiated a handover procedure prior to the timer expiring, information that disables the UE from being handed over to the at least one predetermined target cell.

In some embodiments, the network node 700 is operative to:
  determine a mobility profile for the UE, the mobility profile comprising at least one movement criterion associated with the UE, and
  set the timer value based on the at least one movement criterion.

In some embodiments, the network node 700 is operative to:
  determine a mobility profile for the UE, the mobility profile comprising at least one movement criterion associated with the UE, and operative such that:
  the provision of the handover configuration data to the UE is conditional of the at least one movement criterion.

In some embodiments, the network node 700 is operative to:
  determine a mobility profile for the UE, the mobility profile comprising at least one movement criterion associated with the UE, and
  provide the mobility profile to the UE.

In some embodiments, the network node 700 is operative such that the at least one movement criterion associated with the UE comprises any of:
  a speed of the UE is above a speed threshold,
  a maximum Doppler frequency associated with radio signals transmitted by and/or received by the UE is above a Doppler frequency threshold,
  a rate of change of direction of the UE is above a rate of change of direction threshold, and
  a determination of whether or not the UE is operating in a high speed train environment.

In some embodiments, the network node 700 is operative to:
  determine a position of the UE,
  determine the at least one predetermined target cell based on a preconfigured set of likely candidate cells depending on the determined position of the UE.

In some embodiments, the network node 700 is operative to:
  receive, from one target cell among the at least one predetermined target cells, a notification that the UE has performed a handover procedure associated with the one target cell and, as a consequence of the notification:
  release UE-specific resources associated with the source cell and releasing UE-specific resources associated with any predetermined target cell with which the UE has not performed a handover procedure.

In some embodiments, the network node 700 is operative to any of any of:
  provide, to the UE, an instruction not to apply discontinuous reception, DRX, and
  provide, to the UE, an instruction to apply a specific discontinuous reception, DRX, cycle.

In some embodiments, the network node 700 is operative to:
  control scheduling of the UE such that a rate of reduction of amounts of data in data buffers in the UE is increased.

In some embodiments, the network node 700 is operative to:
  determine a range of positions of the UE in relation to the source cell and the at least one predetermined target cell, the range of positions defining a range in which the handover procedure is to be performed, and
  provide, to the UE, based on the range of positions, data comprising at least one timing advance, TA, value for use in the at least one predetermined target cell.

In some embodiments, the network node 700 is operative to:
  determine at least one system frame number, SFN, offset between a SFN associated with the source cell and a SFN associated with the at least one predetermined target cell, and operative such that the provision of the handover configuration data comprises:
  providing, to the UE, data comprising the at least one SFN offset for use in the at least one predetermined target cell.

In some embodiments, the network node 700 is operative to:
  receive, from the UE, capability information that the UE is capable of performing an autonomous decision to initiate a handover, and operative such that:
  the provision of the handover configuration data to the UE is conditional of the received capability information.

Figure 8:
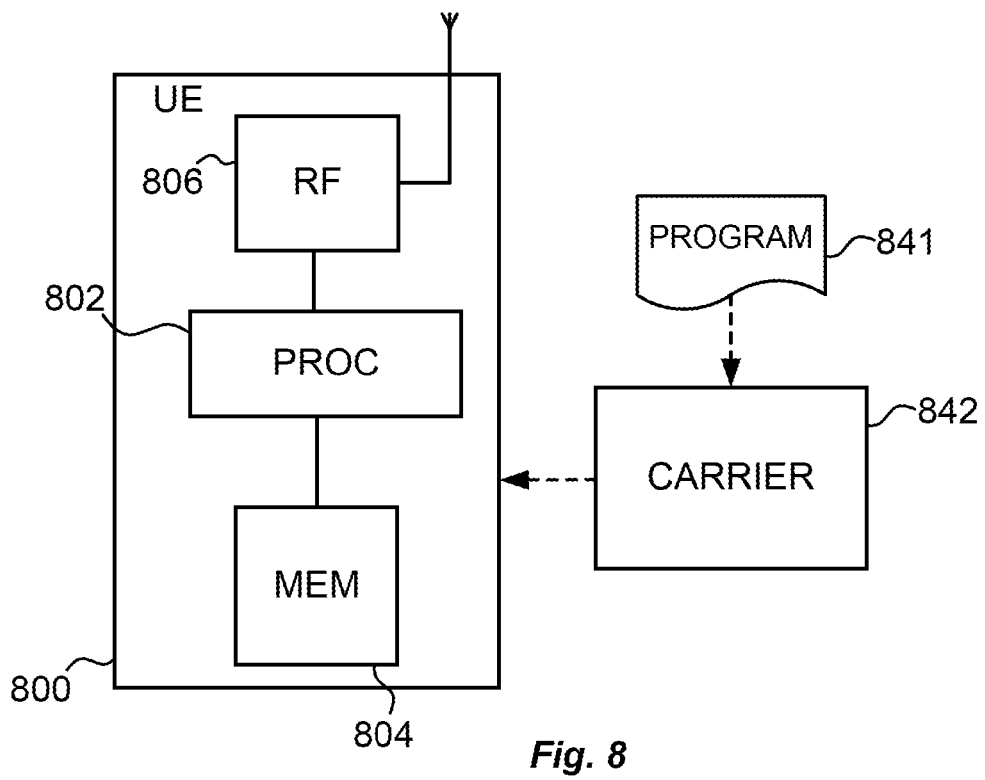
FIG. 8 schematically illustrates a UE.

Turning now to FIG. 8, further embodiments of a UE will be described in some more detail. FIG. 8 schematically illustrates a UE 700 comprising radio frequency, RF, circuitry 806, a processor 802 and a memory 804. The memory 804 contains instructions executable by the processor 802 whereby the UE 800 is operative to:
  receive, from a network node, handover configuration data that comprises information regarding handover to at least one predetermined target cell to which the UE is to perform handover and at least one event triggering condition that defines radio signal measurement conditions for use by the UE when performing an autonomous decision to initiate the handover,
  measure radio signals associated with a source cell and radio signals associated with the at least one predetermined target cell,
  determine, based on the measuring of radio signals, an event according to the at least one event triggering condition, and
  perform, based on the determined event, an autonomous decision to initiate handover to the at least one predetermined target cell.

The instructions that are executable by the processor 802 may be software in the form of a computer program 841. The computer program 841 may be contained in or by a carrier 842, which may provide the computer program 841 to the memory 804 and processor 802. The carrier 842 may be in any suitable form including an electronic signal, an optical signal, a radio signal or a computer readable storage medium.

In some embodiments, the UE 800 is operative such that the at least one event triggering condition is configured for triggering any event of:
  event AX being triggered by the UE based on an outcome of a comparison of signal measurements performed by the UE on the source cell and the at least one predetermined target cell, event AY being triggered by the UE based on an outcome of a comparison of a signal measurement performed by the UE on the source cell with a first threshold, and based on an outcome of a comparison of a signal measurement performed by the UE on the at least one predetermined target cell with a second threshold.

In some embodiments, the UE 800 is operative to:

determine a mobility profile for the UE, the mobility profile comprising at least one movement criterion associated with the UE, and operative such that:

the performing of the autonomous decision to initiate handover is conditional of the at least one movement criterion.

In some embodiments, the UE 800 is operative such that the determination of the mobility profile for the UE comprises:

receiving the mobility profile from the network node.

In some embodiments, the UE 800 is operative such that the at least one movement criterion associated with the UE comprises any of:

a speed of the UE is above a speed threshold, a maximum Doppler frequency associated with radio signals transmitted by and/or received by the UE is above a Doppler frequency threshold, a rate of change of direction of the UE is above a rate of change of direction threshold, and a determination of whether or not the UE is operating in a high speed train environment.

In some embodiments, the UE 800 is operative to any of:

receive, from the network node, an instruction not to apply discontinuous reception, DRX, and receive, from the network node, an instruction to apply a specific discontinuous reception, DRX, cycle, and operate in accordance with the received DRX instructions.

In some embodiments, the UE 800 is operative such that the reception of the handover configuration data comprises reception of at least one timing advance, TA, value for use in the at least one predetermined target cell, and operative to:

perform a handover procedure with the at least one predetermined target cell, wherein the handover procedure comprises requesting a scheduling grant without performing a random access, RA, procedure.

In some embodiments, the UE 800 is operative such that the reception of the handover configuration data comprises reception of at least one system frame number, SFN, offset between a SFN associated with the source cell and a SFN associated with the at least one predetermined target cell, and operative to:

perform a handover procedure with the at least one predetermined target cell, wherein the handover procedure comprises requesting a scheduling grant without reading a master information block, MIB, associated the at least one predetermined target cell.

In some embodiments, the UE 800 is operative to:

provide, to the network node, capability information that the UE is capable of performing an autonomous decision to initiate a handover.

In some embodiments, the UE 800 is operative to:

receive, from the network node, a timer value, start a timer using the timer value, initiate, if not a handover has occurred before the timer has expired, a reestablishment procedure.

Figure 9:
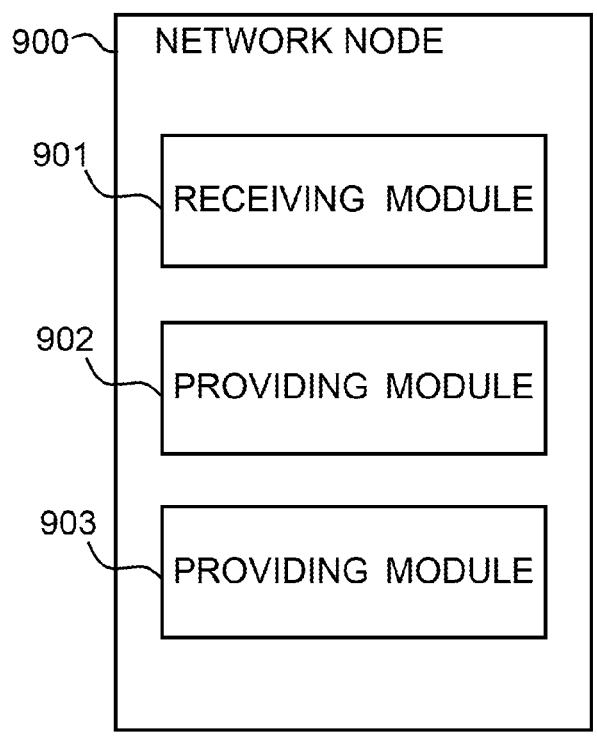
FIG. 9 schematically illustrates a network node.

Turning now to FIG. 9, which illustrates a network node 900 that comprises:

a receiving module 901 configured to receive, from at least one cell in a network, data that comprises information regarding handover, whereby the at least one cell in the network from which the data is received defines at least one predetermined target cell to which a UE is to perform handover, a providing module 902 configured to provide, to the UE, handover configuration data comprising the data received from the at least one cell and comprising at least one event triggering condition that defines radio signal measurement conditions for use by the UE when performing an autonomous decision to initiate the handover, and a providing module 903 configured to provide, to the at least one predetermined target cell, context information associated with the UE for preparing the target cell for a handover procedure initiated by the UE.

The network node 900 may comprise further modules that are configured to perform in a similar manner as, e.g., the network node 700 described above in connection with FIG. 7.

Figure 10:
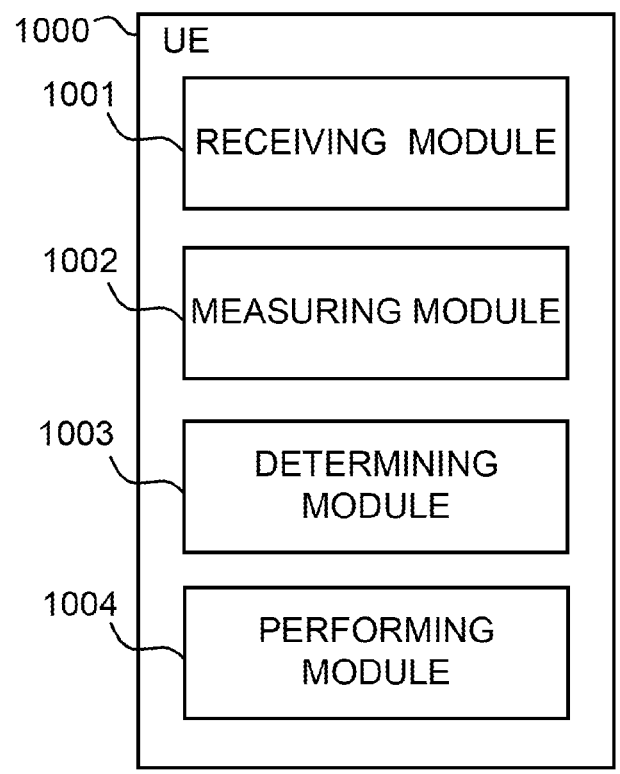
FIG. 10 schematically illustrates a UE.

Turning now to FIG. 10, which illustrates a UE 1000 that comprises:

a receiving module 1001 configured to receive, from a network node, handover configuration data that comprises information regarding handover to at least one predetermined target cell to which the UE is to perform handover and at least one event triggering condition that defines radio signal measurement conditions for use by the UE when performing an autonomous decision to initiate the handover, a measuring module 1002 configured to measure radio signals associated with a source cell and radio signals associated with the at least one predetermined target cell, a determining module 1003 configured to determine, based on the measuring of radio signals, an event according to the at least one event triggering condition, and a performing module 1004 configured to perform, based on the determined event, an autonomous decision to initiate handover to the at least one predetermined target cell.

The UE 1000 may comprise further modules that are configured to perform in a similar manner as, e.g., the UE 800 described above in connection with FIG. 8.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a network node in a network where the network node maintains a source cell in the network, to which source cell a user equipment (UE) is connected, the method comprising:
    receiving, from at least one cell in the network, data that comprises information regarding handover, whereby the at least one cell in the network from which the data is received defines at least one predetermined target cell to which a UE is to perform handover;
    providing, to the UE, handover configuration data comprising the data received from the at least one cell and comprising at least one event triggering condition that defines radio signal measurement conditions for use by the UE when performing an autonomous decision to initiate the handover;
    providing, to the at least one predetermined target cell, context information associated with the UE for preparing the target cell for a handover procedure initiated by the UE; and
    determining a mobility profile for the UE, the mobility profile comprising at least one movement criterion associated with the UE,
    wherein:
    the provision of the handover configuration data to the UE is conditional of the at least one movement criterion; and
    the at least one movement criterion associated with the UE comprises any of:
        a speed of the UE is above a speed threshold;
        a maximum Doppler frequency associated with radio signals transmitted by and/or received by the UE is above a Doppler frequency threshold;
        a rate of change of direction of the UE is above a rate of change of direction threshold; and
        a determination of whether or not the UE is operating in a high speed train environment.

2. The method of claim 1, wherein the at least one event triggering condition is configured for triggering any event of:
    event AX being triggered by the UE based on an outcome of a comparison of signal measurements performed by the UE on the source cell and the at least one predetermined target cell; and
    event AY being triggered by the UE based on an outcome of a comparison of a signal measurement performed by the UE on the source cell with a first threshold, and based on an outcome of a comparison of a signal measurement performed by the UE on the at least one predetermined target cell with a second threshold.

3. The method of claim 1, wherein the handover configuration data comprises a timer value that specifies a time period during which the UE is allowed to initiate the handover procedure, and where the method comprises:
    providing, to the UE, the timer value;
    starting a timer using the timer value; and
    providing, to the at least one predetermined target cell, if the UE has not initiated a handover procedure prior to the timer expiring, information that disables the UE from being handed over to the at least one predetermined target cell.

4. The method of claim 3, comprising:
    determining a mobility profile for the UE, the mobility profile comprising at least one movement criterion associated with the UE; and
    setting the timer value based on the at least one movement criterion.

5. The method of claim 1, comprising:
    determining a mobility profile for the UE, the mobility profile comprising at least one movement criterion associated with the UE; and
    providing the mobility profile to the UE.

6. The method of claim 1, comprising:
    determining a position of the UE; and
    determining the at least one predetermined target cell based on a preconfigured set of likely candidate cells depending on the determined position of the UE.

7. The method of claim 1, comprising:
    receiving, from one target cell among the at least one predetermined target cells, a notification that the UE has performed a handover procedure associated with the one target cell; and
    as a consequence of the notification, releasing UE-specific resources associated with the source cell and releasing UE-specific resources associated with any predetermined target cell with which the UE has not performed a handover procedure.

8. The method of claim 1, comprising any of:
    providing, to the UE, an instruction not to apply discontinuous reception, DRX; and
    providing, to the UE, an instruction to apply a specific discontinuous reception (DRX) cycle.

9. The method of claim 8, comprising:
    controlling scheduling of the UE such that a rate of reduction of amounts of data in data buffers in the UE is increased.

10. The method of claim 1, comprising:
    determining a range of positions of the UE in relation to the source cell and the at least one predetermined target cell, the range of positions defining a range in which the handover procedure is to be performed; and
    providing, to the UE, based on the range of positions, data comprising at least one timing advance (TA) value for use in the at least one predetermined target cell.

11. The method of claim 1, comprising:
  determining at least one system frame number (SFN) offset between a SFN associated with the source cell and a SFN associated with the at least one predetermined target cell; and
  wherein the provision of the handover configuration data comprises:
  providing, to the UE, data comprising the at least one SFN offset for use in the at least one predetermined target cell.

12. The method of claim 1, comprising:
  receiving, from the UE, capability information that the UE is capable of performing an autonomous decision to initiate a handover; and
  wherein:
  the provision of the handover configuration data to the UE is conditional of the received capability information.

13. A network node comprising input/output circuitry, a processor and a memory, said memory containing instructions executable by said processor whereby said network node is operative to:
  receive, from at least one cell in a network, data that comprises information regarding handover, whereby the at least one cell in the network from which the data is received defines at least one predetermined target cell to which a UE is to perform handover;
  provide, to the UE, handover configuration data comprising the data received from the at least one cell and comprising at least one event triggering condition that defines radio signal measurement conditions for use by the UE when performing an autonomous decision to initiate the handover;
  provide, to the at least one predetermined target cell, context information associated with the UE for preparing the target cell for a handover procedure initiated by the UE; and
  determine a mobility profile for the UE, the mobility profile comprising at least one movement criterion associated with the UE,
  wherein the network node is operative such that:
  the provision of the handover configuration data to the UE is conditional of the at least one movement criterion; and
  the at least one movement criterion associated with the UE comprises any of:
    a speed of the UE is above a speed threshold;
    a maximum Doppler frequency associated with radio signals transmitted by and/or received by the UE is above a Doppler frequency threshold;
    a rate of change of direction of the UE is above a rate of change of direction threshold; and
    a determination of whether or not the UE is operating in a high speed train environment.

14. The network node of claim 13, operative such that the at least one event triggering condition is configured for triggering any event of:
  event AX being triggered by the UE based on an outcome of a comparison of signal measurements performed by the UE on the source cell and the at least one predetermined target cell; and
  event AY being triggered by the UE based on an outcome of a comparison of a signal measurement performed by the UE on the source cell with a first threshold, and based on an outcome of a comparison of a signal measurement performed by the UE on the at least one predetermined target cell with a second threshold.

15. The network node of claim 13, operative to:
  determine a range of positions of the UE in relation to the source cell and the at least one predetermined target cell, the range of positions defining a range in which the handover procedure is to be performed; and
  provide, to the UE, based on the range of positions, data comprising at least one timing advance (TA) value for use in the at least one predetermined target cell.

16. The network node of claim 13, operative to:
  determining at least one system frame number, SFN, offset between a SFN associated with the source cell and a SFN associated with the at least one predetermined target cell; and
  operative such that the provision of the handover configuration data comprises:
  providing, to the UE, data comprising the at least one SFN offset for use in the at least one predetermined target cell.

17. A nontransitory computer readable storage medium comprising instructions which, when executed on at least one processor in a network node in a network, cause the network node to carry out a method, wherein the network node maintains a source cell in the network, to which source cell a user equipment (UE) is connected, the method comprising:
  receiving, from at least one cell in the network, data that comprises information regarding handover, whereby the at least one cell in the network from which the data is received defines at least one predetermined target cell to which a UE is to perform handover;
  providing, to the UE, handover configuration data comprising the data received from the at least one cell and comprising at least one event triggering condition that defines radio signal measurement conditions for use by the UE when performing an autonomous decision to initiate the handover;
  providing, to the at least one predetermined target cell, context information associated with the UE for preparing the target cell for a handover procedure initiated by the UE; and
  determining a mobility profile for the UE, the mobility profile comprising at least one movement criterion associated with the UE,
  wherein:
  the provision of the handover configuration data to the UE is conditional of the at least one movement criterion; and
  the at least one movement criterion associated with the UE comprises any of:
    a speed of the UE is above a speed threshold;
    a maximum Doppler frequency associated with radio signals transmitted by and/or received by the UE is above a Doppler frequency threshold;
    a rate of change of direction of the UE is above a rate of change of direction threshold; and
    a determination of whether or not the UE is operating in a high speed train environment.

* * * * *